United States Patent
Chen et al.

(10) Patent No.: US 11,891,303 B2
(45) Date of Patent: Feb. 6, 2024

(54) CATALYST COMPOSITION, CATALYST AND METHOD FOR MANUFACTURING THE SAME, AND METHOD FOR HYDROGEN PRODUCTION

(71) Applicant: National Cheng Kung University, Tainan (TW)

(72) Inventors: Wei-Hsin Chen, Kaohsiung (TW); Yi-Kai Chih, Chiayi (TW)

(73) Assignee: National Cheng Kung University, Tainan (TW)

( * ) Notice: Subject to any disclaimer, the term of this patent is extended or adjusted under 35 U.S.C. 154(b) by 77 days.

(21) Appl. No.: 17/567,175

(22) Filed: Jan. 3, 2022

(65) Prior Publication Data

US 2022/0402757 A1 Dec. 22, 2022

(30) Foreign Application Priority Data

Jun. 21, 2021 (TW) .................................. 110122579

(51) Int. Cl.
| | |
|---|---|
| *C01B 3/40* | (2006.01) |
| *B01J 21/16* | (2006.01) |
| *B01J 23/72* | (2006.01) |
| *B01J 23/755* | (2006.01) |
| *B01J 37/04* | (2006.01) |
| *B01J 37/00* | (2006.01) |
| *B01J 37/08* | (2006.01) |
| *B01J 37/02* | (2006.01) |
| *B01J 35/02* | (2006.01) |

(52) U.S. Cl.
CPC ................ *C01B 3/40* (2013.01); *B01J 21/16* (2013.01); *B01J 23/72* (2013.01); *B01J 23/755* (2013.01); *B01J 35/026* (2013.01); *B01J 37/0009* (2013.01); *B01J 37/0217* (2013.01); *B01J 37/04* (2013.01); *B01J 37/08* (2013.01); *C01B 2203/0233* (2013.01); *C01B 2203/1058* (2013.01); *C01B 2203/1076* (2013.01); *C01B 2203/1082* (2013.01); *C01P 2002/88* (2013.01)

(58) Field of Classification Search
CPC .... C01B 3/40; B01J 21/16; B01J 23/72; B01J 23/75; B01J 23/755; B01J 35/026; B01J 37/0009; B01J 37/0217; B01J 37/04; B01J 37/08
See application file for complete search history.

(56) References Cited

FOREIGN PATENT DOCUMENTS

| | | | | |
|---|---|---|---|---|
| TW | 200812700 | * | 5/1996 | ............ B01J 23/63 |
| TW | 200812700 | | 3/2008 | |

OTHER PUBLICATIONS

Lytkina et al., Int. J. hydro. Energ., (2015), v.40, p. 9677-9684.*
Antonyuk et al., Kinetics and Catalysis, (2000), 41(6), 831-833. (Disclosed in IDS).*
S. N. Antonyuk, A. L. Lapidus, V. B. Kazanskii, V. I. Yakerson, A. A. Khanumyan, E. Z. Golosman, A. I. Nechugovskii, O. Yu. Pesin,"Methanol Decomposition in a Water-Methanol Equimolar Mixture on a Nickel-Promoted Copper-Zinc-Cement Catalyst", Kinetics and Catalysis, vol. 41, No. 6, Nov. 2000, pp. 753-755, Nov. 2000.

* cited by examiner

*Primary Examiner* — Yong L Chu
(74) *Attorney, Agent, or Firm* — Winston Hsu (57) ABSTRACT

A catalyst composition for manufacturing a catalyst for hydrogen production based on thermochemical reaction of methanol is disclosed. The catalyst composition includes a support component and an active component. The support component includes cement and clay, wherein a weight ratio of the cement to the clay is 3/7 to 9/1. The active component includes copper oxide or a precursor of copper oxide. Based on 100 parts by weight of the support component, a content of the active component is 5 to 10 parts by weight.

12 Claims, 5 Drawing Sheets

CATALYST COMPOSITION, CATALYST AND METHOD FOR MANUFACTURING THE SAME, AND METHOD FOR HYDROGEN PRODUCTION

BACKGROUND OF THE INVENTION

1. Field of the Invention

The present disclosure relates to a catalyst composition, a catalyst and a method for manufacturing the same, and a method for hydrogen production by using the catalyst, and more particularly, to a catalyst composition, a catalyst and a method for manufacturing the same, and a method for hydrogen production by using the catalyst capable of reducing cost.

2. Description of the Prior Art

With the depletion of fossil fuels and the impact of the greenhouse effect on the environment caused by the burning of fossil fuels, clean and economical alternative energy sources, such as fuel cells, have become the focus of attention.

Fuel cells can use hydrogen as fuel, and methanol is one of the raw materials for hydrogen production. For example, the hydrogen production methods include methanol decomposition reaction, methanol steam reforming reaction, partial oxidation of methanol reaction and autothermal reforming of methanol reaction. The four reactions all use methanol as the reactant to produce hydrogen. Conventionally, the catalyst for hydrogen production based on thermochemical reaction of methanol includes a support and an active component with catalytic ability. The common main component of the support is aluminum oxide and/or zirconium dioxide. When manufacturing the kind of catalyst, the aluminum oxide and/or the zirconium dioxide need to be subjected to a high temperature treatment first. Afterward, the active component is adhered on the support, and another high temperature treatment is applied. In other words, when manufacturing the kind of catalyst, two high temperature treatments are required, which consumes more energy. Moreover, the costs of the aluminum oxide and zirconium dioxide are high. Accordingly, it is difficult to reduce the cost of the kind of catalyst, which results in the high cost of the hydrogen production.

SUMMARY OF THE INVENTION

According to one aspect of the present disclosure, a catalyst composition for manufacturing a catalyst for hydrogen production based on thermochemical reaction of methanol is disclosed. The catalyst composition includes a support component and an active component. The support component includes cement and clay, wherein a weight ratio of the cement to the clay is 3/7 to 9/1. The active component includes copper oxide or a precursor of copper oxide. Based on 100 parts by weight of the support component, a content of the active component is 5 to 10 parts by weight.

According to another aspect of the present disclosure, a method for manufacturing a catalyst for hydrogen production based on thermochemical reaction of methanol is disclosed. The method for manufacturing the catalyst includes steps as follows. A support component is provided, wherein the support component includes cement and clay, and a weight ratio of the cement to the clay is 3/7 to 9/1. A shaping step is performed, wherein the support component and water are mixed and shaped to obtain a support precursor. An active component is provided, wherein the active component is distributed on a surface of the support precursor, and the active component includes copper oxide or a precursor of copper oxide. A drying step is performed, wherein the water in the support precursor is removed. A thermal treatment step is performed, wherein the support precursor is sintered to form a support, so as to obtain the catalyst.

According to further another aspect of the present disclosure, a catalyst is disclosed. The catalyst is manufactured by the aforementioned method.

According to yet another aspect of the present disclosure, a method for hydrogen production based on thermochemical reaction of methanol is disclosed. The method for hydrogen production includes steps as follows. The aforementioned catalyst is provided. A reactant is provided, wherein the reactant includes methanol. A contacting step is performed, wherein the reactant and the catalyst are contacted at a reaction temperature, such that the reactant undergoes a reaction to produce hydrogen.

These and other objectives of the present invention will no doubt become obvious to those of ordinary skill in the art after reading the following detailed description of the preferred embodiment that is illustrated in the various figures and drawings.

DETAILED DESCRIPTION

Catalyst Composition

According to the present disclosure, a catalyst composition is provided. The catalyst composition is for manufacturing a catalyst for hydrogen production based on thermochemical reaction of methanol. The catalyst composition includes a support component and an active component. The support component includes cement and clay, wherein a weight ratio of the cement to the clay is 3/7 to 9/1. As such, a support made of the support component can be featured with capability of improving the catalytic activity of the active component and the formability thereof. The active component includes copper oxide or a precursor of copper oxide. Based on 100 parts by weight of the support component, a content of the active component is 5 to 10 parts by weight. As such, the content of the active component is proper, which allows the catalyst to have sufficient catalytic activity and prevents the active component from agglomerating or peeling off from the support. Moreover, by using the cement and the clay as the support component, the cost of raw materials can be reduced. Moreover, the active component can be stabilized, which is beneficial to improve the catalytic activity and long-term performance of the catalyst.

Specifically, the cement may be commercially available cement, such as sulfur-based cement or Portland cement, and the clay may be commercially available clay. Preferably, the weight ratio of the cement to the clay may be 35/65 to 65/35. The cement may include calcium (Ca), oxygen (O), silicon (Si) and sulfur (S), and may selectively include magnesium (Mg) and aluminum (Al). Based on 100 parts by weight of the cement, a content of the Ca in the cement may be 20 to 70 parts by weight, a content of the O in the cement may be 10 to 40 parts by weight, a content of the Si in the cement may be 1 to 20 parts by weight, a content of the S in the cement may be 1 to 40 parts by weight, a content of the Mg in the cement may be greater than 0 part by weight and less than or equal to 5 parts by weight, and a content of the Al in the cement may be greater than 0 part by weight and less than or equal to 5 parts by weight. Preferably, based on 100 parts by weight of the cement, the content of the Ca in the cement may be 35 to 60 parts by weight, the content of the O in the cement may be 20 to 35 parts by weight, the content of the Si in the cement may be 2 to 12 parts by weight, the content of the S in the cement may be 6 to 25 parts by weight, the content of the Mg in the cement may be greater than 0 part by weight and less than or equal to 1 part by weight, and the content of the Al in the cement may be greater than 0 part by weight and less than or equal to 2 parts by weight. The clay may include Si, O and Al. Based on 100 parts by weight of the clay, a content of the Si in the clay may be 20 to 60 parts by weight, a content of the O in the clay may be 10 to 50 parts by weight, and a content of the Al in the clay may be 1 to 40 parts by weight. Preferably, based on 100 parts by weight of the clay, the content of the Si in the clay may be 30 to 50 parts by weight, the content of the O in the clay may be 30 to 50 parts by weight, and the content of the Al in the clay may be 10 to 30 parts by weight.

The aforementioned "precursor of copper oxide" refers to a substance that can be converted into copper oxide after a thermal treatment step. The active component may selectively include nickel oxide or a precursor of nickel oxide. The precursor of nickel oxide refers to a substance that can be converted into nickel oxide after the thermal treatment step. Details of the heat treatment step are described below and omitted herein. The precursor of copper oxide and the precursor of nickel oxide may be copper-containing salts and nickel-containing salts, respectively. For example, the anions of the copper-containing salts and the nickel-containing salts may be hydroxide ion ($OH^-$), nitrate ion ($NO_3^-$), acetate ion ($CH_3COO^-$), carbonate ion ($CO_3^{2-}$), sulfate ion ($SO_4^{2-}$), etc. By adding the nickel oxide or the precursor of nickel oxide, the long-term performance of the catalyst can be improved. Based on 100 parts by weight of the copper oxide or the precursor of copper oxide, a content of the nickel oxide or the precursor of nickel oxide may be greater than 0 part by weight and less than or equal to 30 parts by weight. The active component may only include the copper oxide or the precursor of copper oxide, and the nickel oxide or the precursor of nickel oxide.

Method for Manufacturing Catalyst

Figure 1:
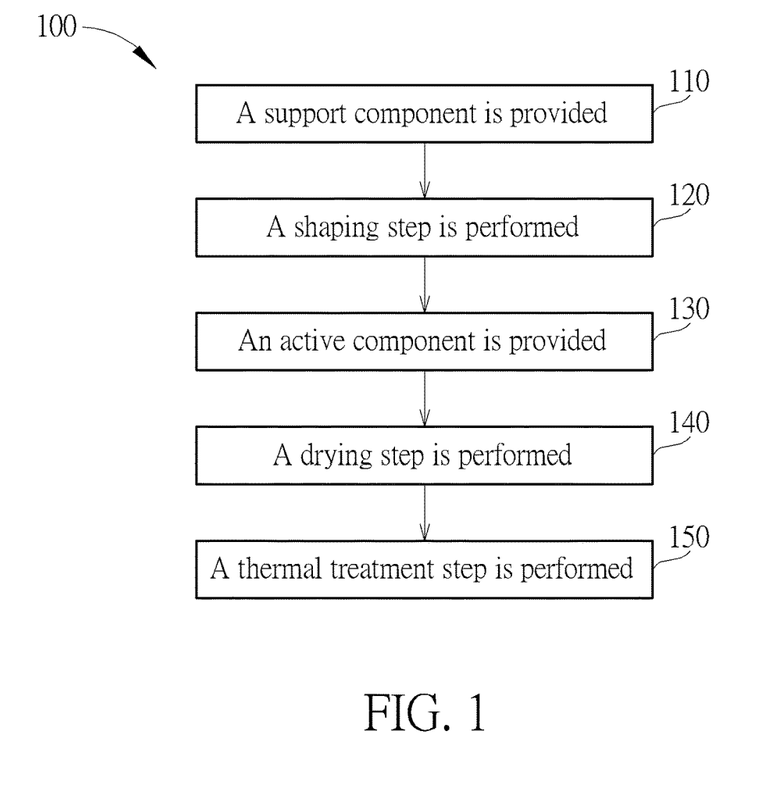
FIG. 1 is a flow diagram showing a method for manufacturing a catalyst according to one embodiment of the present disclosure.

Please refer to FIG. 1, a method 100 for manufacturing a catalyst includes Steps 110 to 150. In Step 110, a support component is provided. Details of the support component are mentioned above and omitted herein.

In Step 120, a shaping step is performed, wherein the support component and water are mixed and shaped to obtain a support precursor. The water is provided to help the support component to be shaped. The amount of the water can be adjusted according to the weight of the support component, the ratio of the cement and the clay of the support component and/or the ambient temperature. For example, based on 100 parts by weight of the support component, the content of the water may be 10 parts by weight to 30 parts by weight. The support precursor may be in a form of particles. As such, the surface of the support precursor can be increased, and the catalytic activity of the catalyst can be improved thereby. For example, the support component may be mixed with the water and then be granulated with a granulator to form the support precursor in particles. In addition, the shapes of the particles of the support precursor may be, but are not limited to, spherical, cylindrical or square columnar. According to one embodiment of the present disclosure, the particle size of the support precursor may be 0.2 cm to 0.5 cm. However, the present disclosure is not limited thereto. The particle size of the support precursor may be adjusted according to practical needs.

In Step 130, an active component is provided, wherein the active component is distributed on a surface of the support precursor. Details of the active component are mentioned above and omitted herein.

In Step 140, a drying step is performed, wherein the water in the support precursor is removed. The drying step may be performed at 20° C. to 100° C. for 6 hours to 72 hours.

In Step 150, a thermal treatment step is performed, wherein the support precursor is sintered to form a support, so as to obtain the catalyst. The thermal treatment step may be performed at 500° C. to 800° C. for 1 hour to 10 hours. Specifically, when the active component includes the precursor of copper oxide, the precursor of copper oxide is converted into the copper oxide by the thermal treatment step. When the active component includes the precursor of copper oxide and the precursor of nickel oxide, the precursor of copper oxide and the precursor of nickel oxide are converted into the copper oxide and the nickel oxide by the thermal treatment step.

According to the above description, by using the cement and clay as the support component, the support precursor does not need to be subjected to a high temperature treatment before supporting the active component. Compared with the catalyst using the aluminum oxide and/or the zirconium dioxide as the main component of the support, the method for manufacturing the catalyst of the present disclosure can omit one high temperature treatment, which is beneficial to reduce energy cost.

Catalyst

According to present disclosure, a catalyst is provided. The catalyst is manufactured by the method 100 for manufacturing the catalyst. The catalyst is adapted for hydrogen production based on thermochemical reaction of methanol. The catalyst of the present disclosure has the advantages of low cost and excellent long-term performance based on its composition and manufacturing method. Furthermore, the performance of the catalyst of the present disclosure can be comparable to commercial catalysts.

Method for Hydrogen Production

Figure 2:
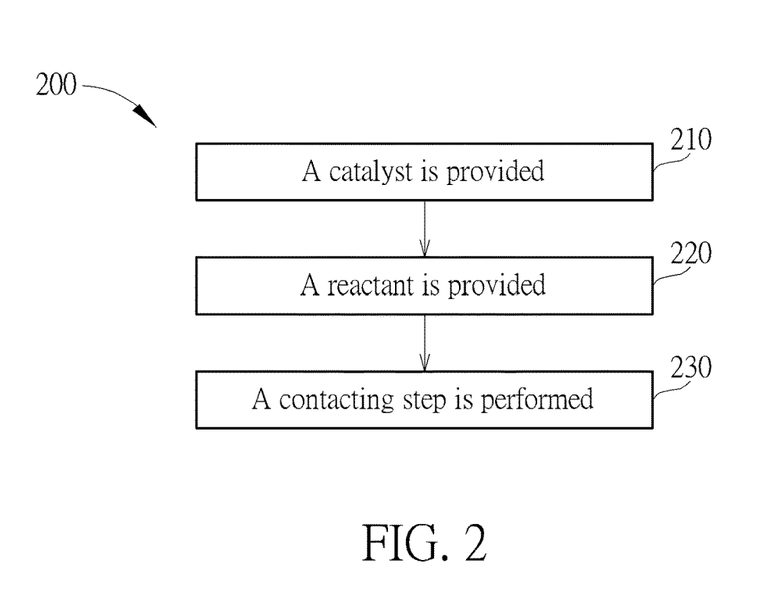
FIG. 2 is a flow diagram showing a method for hydrogen production according to one embodiment of the present disclosure.

Please refer to FIG. 2. According to the present disclosure, a method 200 for hydrogen production is provided. The method 200 for hydrogen production is based on thermochemical reaction of methanol. The thermochemical reaction of methanol may be methanol decomposition reaction, methanol steam reforming reaction, partial oxidation of methanol reaction and autothermal reforming of methanol reaction. The reaction equations are respectively represented by formula (1) to formula (4):

$$CH_3OH \leftrightarrows 2H_2 + CO \quad (1);$$

$$CH_3OH + H_2O \leftrightarrows 3H_2 + CO_2 \quad (2);$$

$$CH_3OH + 0.5O_2 \leftrightarrows 2H_2 + CO_2 \quad (3);$$

$$CH_3OH + (1-n)H_2O + 0.5O_2 \leftrightarrows (3-n)H_2 + CO_2 \quad (4).$$

The method 200 for hydrogen production includes Steps 210 to 230. In Step 210, a catalyst is provided. Details of the catalyst are mentioned above and omitted herein. In Step 220, a reactant is provided, wherein the reactant includes methanol. Specifically, as shown in formula (1) to formula (4), when the method 200 for hydrogen production undergoes the methanol decomposition reaction, the reactant only includes methanol. When the method 200 for hydrogen production undergoes the methanol steam reforming reaction, the reactants are methanol and water. When the method 200 for hydrogen production undergoes the partial oxidation of methanol reaction, the reactants are methanol and oxygen. When the method 200 for hydrogen production undergoes the autothermal reforming of methanol reaction, the reactants are methanol, oxygen and water. In Step 230, a contacting step is performed, wherein the reactant and the catalyst are contacted at a reaction temperature, such that the reactant undergoes a reaction to produce hydrogen. When the method 200 for hydrogen production undergoes the methanol decomposition reaction, the reaction temperature is 200° C. to 400° C. When the method 200 for hydrogen production undergoes the methanol steam reforming reaction, the reaction temperature is 150° C. to 400° C. When the method 200 for hydrogen production undergoes the partial oxidation of methanol reaction, the reaction temperature is 200° C. to 700° C. When the method 200 for hydrogen production undergoes the autothermal reforming of methanol reaction, the reaction temperature is 200° C. to 700° C.

The method for hydrogen production of the present disclosure has the advantage of low cost by using the catalyst with low cost, and has the advantage of excellent yield.

Preparation of Examples and Comparative Examples

The component of Cements 1 to 3 and Clay 1 used in examples and comparative examples are analyzed by energy-dispersive X-ray spectroscopy (EDS). The results are shown in Table 1, wherein Cement 1 is sulfur-based cement, and Cement 3 is Portland cement.

TABLE 1

| | | (unit: wt %) | | |
|---|---|---|---|---|
| element | Cement 1 | Cement 2 | Cement 3 | Clay 1 |
| O | 24.59 | 30.51 | 26.55 | 38.09 |
| Mg | 0.20 | 0.08 | 0.49 | — |
| Al | 0.87 | 0.57 | 1.22 | 20.67 |
| Si | 6.78 | 7.15 | 7.33 | 38.80 |
| S | 15.52 | 19.86 | 11.26 | — |
| Ca | 52.04 | 41.83 | 53.15 | — |

Example (EX.) 1: 65 g of Cement 2, 35 g of Clay 1 and 20 g of water are mixed and granulated with a granulator to form a support precursor in particles. The particle size of the support precursor is 0.2 cm to 0.5 cm. 5 g of powder of copper hydroxide (with a particle size of 0.5-50 μm) is sprinkled on a surface of the support precursor and stood still for 6 hours at room temperature to evaporate the water in the support precursor. Afterward, the support precursor with the powder of copper hydroxide are heated at 600° C. for 6 hours under atmospheric environment, such that the copper hydroxide is converted into copper oxide, and the support precursor is sintered to form a support, so as to obtain a catalyst of EX. 1.

EXs. 2-5 and Comparative Examples (CEXs.) 1-4: the support component and the active component of EX. 1 are replaced by the support components and the active components of EXs. 2-5 and CEXs. 1-4 shown in Table 2. Other details for preparing EXs. 2-5 and CEXs. 1-4 are the same as that of EX. 1, such that catalysts of EXs. 2-5 and CEXs. 1-4 are obtained.

TABLE 2

| EX. | support component | active component |
|---|---|---|
| 1 | Cement 2 (65 g); Clay 1 (35 g) | 5 g (copper hydroxide) |
| 2 | Cement 2 (65 g); Clay 1 (35 g) | 5 g (copper hydroxide:nickel hydroxide = 100:20) |
| 3 | Cement 2 (65 g); Clay 1 (35 g) | 5 g (copper oxide:nickel oxide = 100:20) |
| 4 | Cement 1 (65 g); Clay 1 (35 g) | 5 g (copper hydroxide:nickel hydroxide = 100:20) |
| 5 | Cement 3 (65 g); Clay 1 (35 g) | 5 g (copper hydroxide:nickel hydroxide = 100:20) |

| CEX. | support component | active component |
|---|---|---|
| 1 | Clay 1 (100 g) | 5 g nickel hydroxide |
| 2 | Clay 1 (100 g) | 5 g copper hydroxide |
| 3 | Clay 1 (100 g) | 5 g (copper hydroxide:nickel hydroxide = 1:20) |
| 4 | Cement 2 (65 g); Clay 1 (35 g) | 5 g (nickel hydroxide) |

The catalysts of EXs. 1-5 and CEXs. 1-4 are applied to hydrogen production based on methanol steam reforming reaction. Please refer to FIG. 3, which is a schematic diagram showing a device 30 for hydrogen production according to one embodiment of the present disclosure. The device 30 includes a container 300, an ultrasonic spray device 310, and a thermocouple 320 (only the thermocouple wire is shown). A ceramic bed 330 and a catalyst 340 are placed at the bottom of the container 300, wherein the ceramic bed 330 is used for elevating the catalyst 340, such that the catalyst 340 is located in the middle section of the container 300. The catalyst 340 is one of the catalysts of EXs. 1 to 5 and CEXs. 1 to 4. The reactants and nitrogen are introduced into the container 300 by passing the inlet 311 and the ultrasonic spray device 310. Herein, the reactants are water and methanol with a molar ratio of 2 to 1 and a flow rate of 1 mL/min. The nitrogen is provided to allow the reactants and products to move toward the outlet 312. A flow rate of the nitrogen is 1000 mL/min. The temperature of the container 300 is detected by the thermocouple 320, and the temperature of the container 300 is maintained at 250° C. (i.e., the reaction temperature). The reactants are vaporized into vapor when entering into the container 300. The products are exhausted from the outlet 312. The products are analyzed by gas chromatography (GC) and a gas analyzer. The results are shown in Table 3, in which the columns from left to right represent the serial number of the catalyst, the content of $CO_2$, the content of CO, the content of $CH_4$, the conversion rate of methanol (Conv.), the content of $H_2$, and the yield of $H_2$ (the moles of hydrogen produced per mole of methanol) of the products. The theoretical value of the yield of $H_2$ is 3 mol/(mol of $CH_3OH$).

TABLE 3

| EX. | $CO_2$ (wt %) | CO (wt %) | $CH_4$ (ppm) | Conv. (%) | $H_2$ (wt %) | yield of $H_2$ mol/(mol of $CH_3OH$) |
|---|---|---|---|---|---|---|
| 1 | 12.5 | 0.1 | 184 | 81.20 | 34.0 | 2.42 |
| 2 | 6.0 | 8.5 | 1618 | 90.04 | 34.1 | 2.53 |
| 3 | 7.0 | 6.6 | 1010 | 86.71 | 31.8 | 2.25 |
| 4 | 6.6 | 5.7 | 1630 | 59.20 | 34.6 | 1.76 |
| 5 | 4.5 | 5.2 | 2149 | 44.00 | 25.7 | 1.22 |

| CEX. | $CO_2$ (wt %) | CO (wt %) | $CH_4$ (ppm) | Conv. (%) | $H_2$ (wt %) | yield of $H_2$ mol/(mol of $CH_3OH$) |
|---|---|---|---|---|---|---|
| 1 | 0.6 | 1.2 | 15757 | 6.89 | 1.4 | 0.06 |
| 2 | 2.6 | 6.1 | 38804 | 44.75 | 14.2 | 0.76 |
| 3 | 0.4 | 0.9 | 10287 | 4.63 | 0.5 | 0.02 |
| 4 | 2.8 | 3.1 | 13650 | 24.45 | 5.0 | 0.22 |

As shown in Table 3, the catalysts of EXs. 1 to 5 of the present disclosure can provide excellent catalytic activity when applied to the hydrogen production based on the methanol steam reforming reaction. The hydrogen yields of EXs. 1 to 5 are 40.67% to 84.33% of the theoretical value. The hydrogen yields of CEXs. 1 to 4 are only 0.67% to 25.33% of the theoretical value. Furthermore, the catalysts of EXs. 1 to 5 of the present disclosure can significantly inhibit the production of methane. As shown in EX. 1 and CEX. 1 (only the active components are different), the copper oxide has excellent catalytic activity, while the nickel oxide has poor catalytic activity. As shown in EXs. 1 and 2 (only the active components are different), the catalytic activity can be effectively improved by adding the nickel oxide into the copper oxide. As shown in EX. 1 and CEX. 2 (only the support components are different), the support component of the present disclosure can improve the catalytic activity effectively. As shown in EXs. 2, 4, 5 and CEX. 3 (only the support components are different), the support component of the present disclosure can improve the catalytic activity effectively.

EXs. 6-7: the support component and the active component of EX. 1 are replaced by the support component and the active component of EXs. 6-7 shown in Table 4, and the amount of water in the shaping step is changed from 20 g to 14 g. Other details for preparing EXs. 6-7 are the same as that of EX. 1, such that catalysts of EXs. 6-7 are obtained. In Table 4, the column of active component records the total weight of active component, and the weight ratio of the copper hydroxide to the nickel hydroxide is placed in parentheses.

TABLE 4

| EX. | support component | active component |
|---|---|---|
| 6 | Cement 2 (42 g); Clay 1 (72 g) | 5 g (copper hydroxide:nickel hydroxide = 100:10) |
| 7 | Cement 2 (42 g); Clay 1 (72 g) | 5 g (copper hydroxide:nickel hydroxide = 100:30) |

Figure 3:
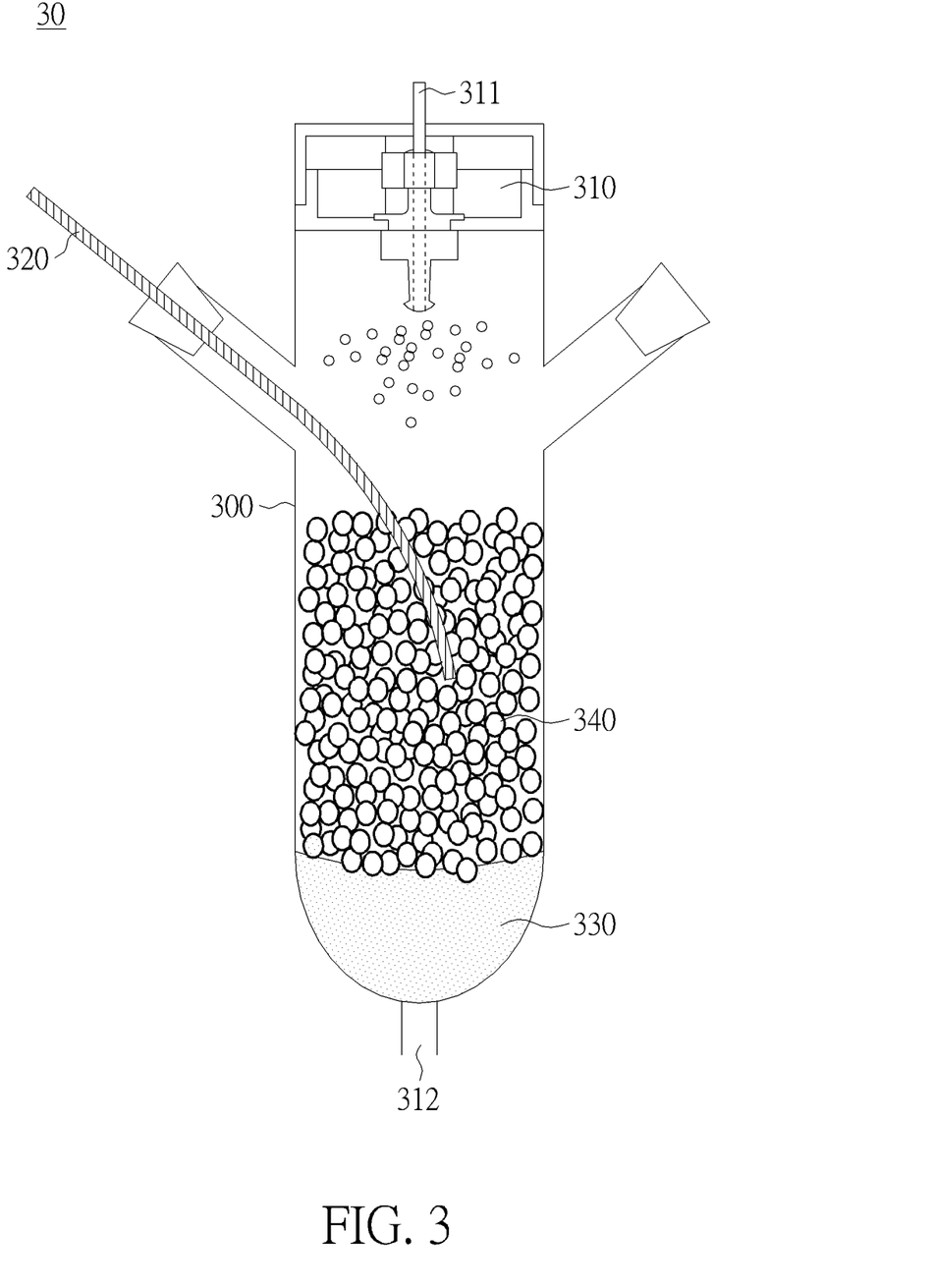
FIG. 3 is a schematic diagram showing a device for hydrogen production according to one embodiment of the present disclosure.

The catalysts of EXs. 6-7 are applied to the hydrogen production based on the partial oxidation of methanol reaction, in which the device 30 is used. The temperature of the container 300 is maintained at 200° C. (i.e., the reaction temperature). The reactants are oxygen and methanol. The molar ratio of the oxygen to the methanol ($O_2/C$) of the reactants and the flow rate of the nitrogen are adjusted. The products are analyzed by gas chromatography and the gas analyzer. The results are shown in Table 5, in which the columns from left to right represent the serial number of experiments, the molar ratio of the oxygen to the methanol ($O_2/C$), the flow rate of the nitrogen ($N_2$), the content of $CO_2$, the content of CO, the content of $CH_4$, and the yield of $H_2$ (the moles of hydrogen produced per mole of methanol) of the products. The theoretical value of the yield of $H_2$ is 2 mol/(mol of $CH_3OH$). The serial numbers 6-1 to 6-6 are the experiment results of the catalyst of EX. 6, and the serial numbers 7-1 to 7-6 are the experiment results of the catalyst of EX. 7.

TABLE 5

| serial number | $O_2/C$ | $N_2$ (mL/min) | $CO_2$ (vol %) | CO (vol %) | $CH_4$ (ppm) | yield of $H_2$ mol/(mol of $CH_3OH$) |
|---|---|---|---|---|---|---|
| 6-1 | 0.5 | 1700 | 12.1 | 8.3 | 1157 | 1.57 |
| 6-2 | 0.6 | 1700 | 11.2 | 9.8 | 2059 | 1.53 |
| 6-3 | 0.5 | 2000 | 10.4 | 8.1 | 1861 | 1.65 |
| 6-4 | 0.6 | 2000 | 12.5 | 7.6 | 2051 | 1.65 |
| 6-5 | 0.5 | 2500 | 9.2 | 7.0 | 1822 | 1.75 |
| 6-6 | 0.6 | 2500 | 9.4 | 7.8 | 1600 | 1.55 |
| 7-1 | 0.5 | 1700 | 8.7 | 10.2 | 1101 | 1.40 |
| 7-2 | 0.6 | 1700 | 11.1 | 11.5 | 2051 | 1.48 |
| 7-3 | 0.5 | 2000 | 7.4 | 9.2 | 1068 | 1.44 |
| 7-4 | 0.6 | 2000 | 10.6 | 9.8 | 1702 | 1.55 |
| 7-5 | 0.5 | 2500 | 7.9 | 8.7 | 1269 | 1.81 |
| 7-6 | 0.6 | 2500 | 8.9 | 8.4 | 1561 | 1.60 |

As shown in Table 5, the hydrogen yields of the serial numbers 6-1 to 7-6 are 70% to 90.5% of the theoretical value. It shows that the catalysts of EXs. 6-7 of the present disclosure can provide excellent catalytic activity when applied to the hydrogen production based on the partial oxidation of methanol reaction.

Figure 4:
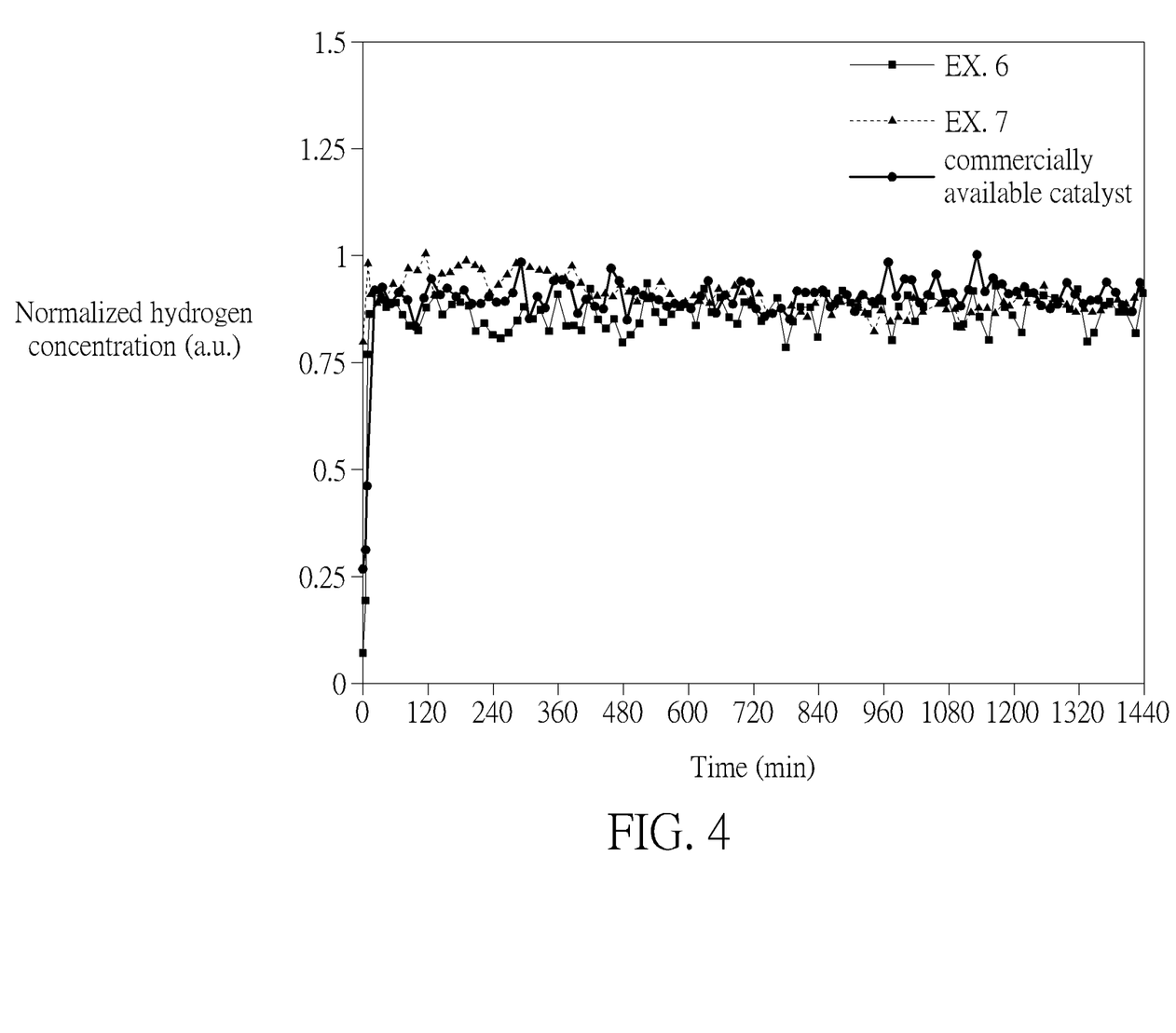
FIG. 4 shows relationships of normalized hydrogen concentration and time of Examples 6, 7 and a commercially available catalyst.

Please refer to FIG. 4, which shows relationships of normalized hydrogen concentration and time of EXs. 6, 7 and a commercially available catalyst. The catalysts of EXs. 6, 7 and the commercially available catalyst are applied to the hydrogen production based on the methanol steam reforming reaction, in which the device 30 is used. The reactants are water and methanol with a molar ratio of 2 to 1 and a flow rate is 1 mL/min. The flow rate of nitrogen is 1000 mL/min. The reaction temperature is 250° C. As shown in FIG. 4, the hydrogen production capacities of EXs. 6 and 7 of the present disclosure do not become poor after 1440 minutes, which shows that the catalysts of the present disclosure have excellent long-term performance. Furthermore, comparing the catalysts of EXs. 6 and 7 of the present disclosure with the commercially available catalyst, the data shown in FIG. 6 are similar, which shows that the performances of the catalysts of the present disclosure are comparable to that of the commercially available catalyst.

Figure 5:
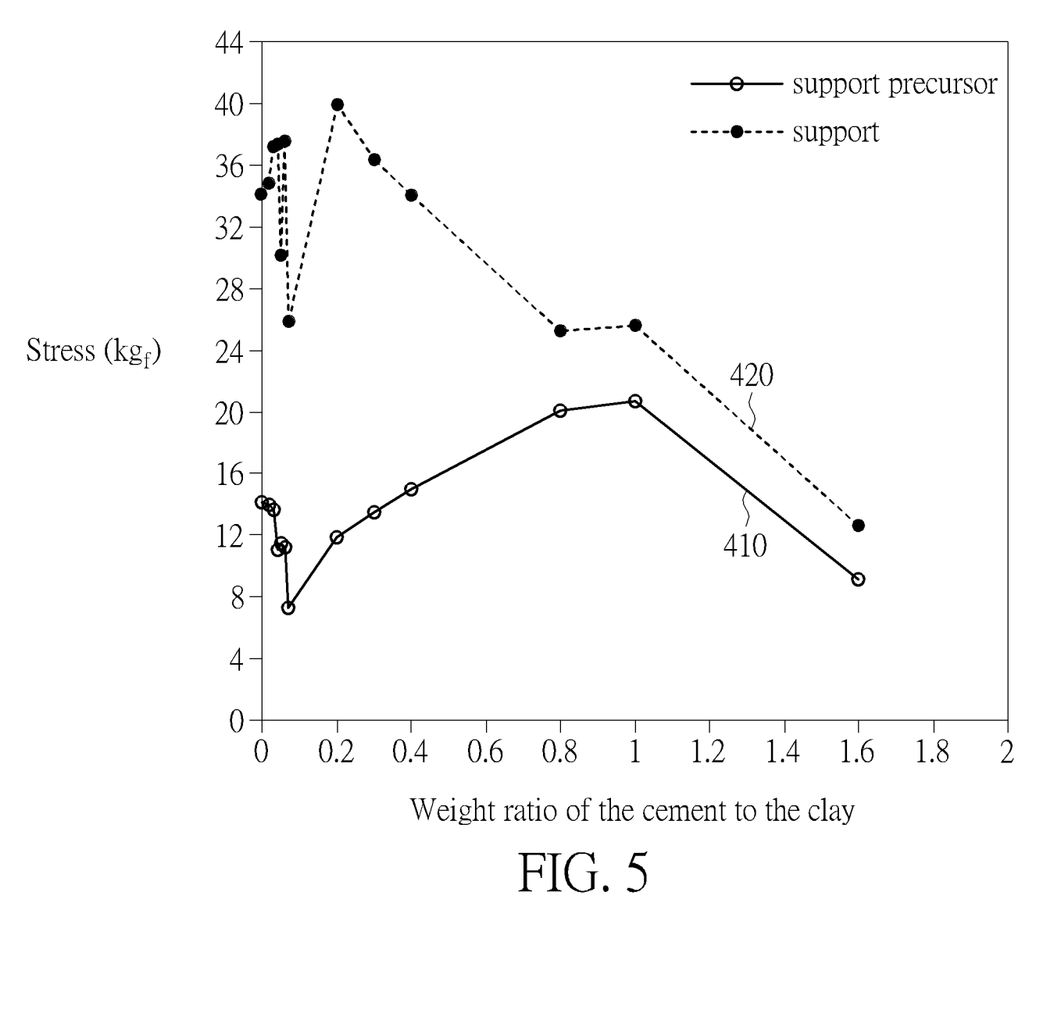
FIG. 5 shows a relationship of support component and stress.

Please refer to FIG. 5, which shows a relationship of the support component and stress. The horizontal coordinate represents a weight ratio of the cement to the clay in the support component, and the vertical coordinate represents the stress. The measurement method is as follows: a plurality of cylinders made of different support components are formed, each of the cylinders has a height of 1.0 cm and a bottom area of 1.76 cm². The cylinders are dried for three days to obtain the support precursors. The support precursors are subjected to a thermal treatment step to obtain the supports. Stresses of the support precursors and the supports are measured with an instrument (model: Cometech Testing Machines CO., Ltd. QC-50AM2F). The results are shown in FIG. 5, wherein a curve 410 is the measurement result of the support precursors, and a curve 420 is the measurement result of the supports. As shown in FIG. 5, the stress tolerance of the supports can be improved by the thermal treatment step.

Figure 6:
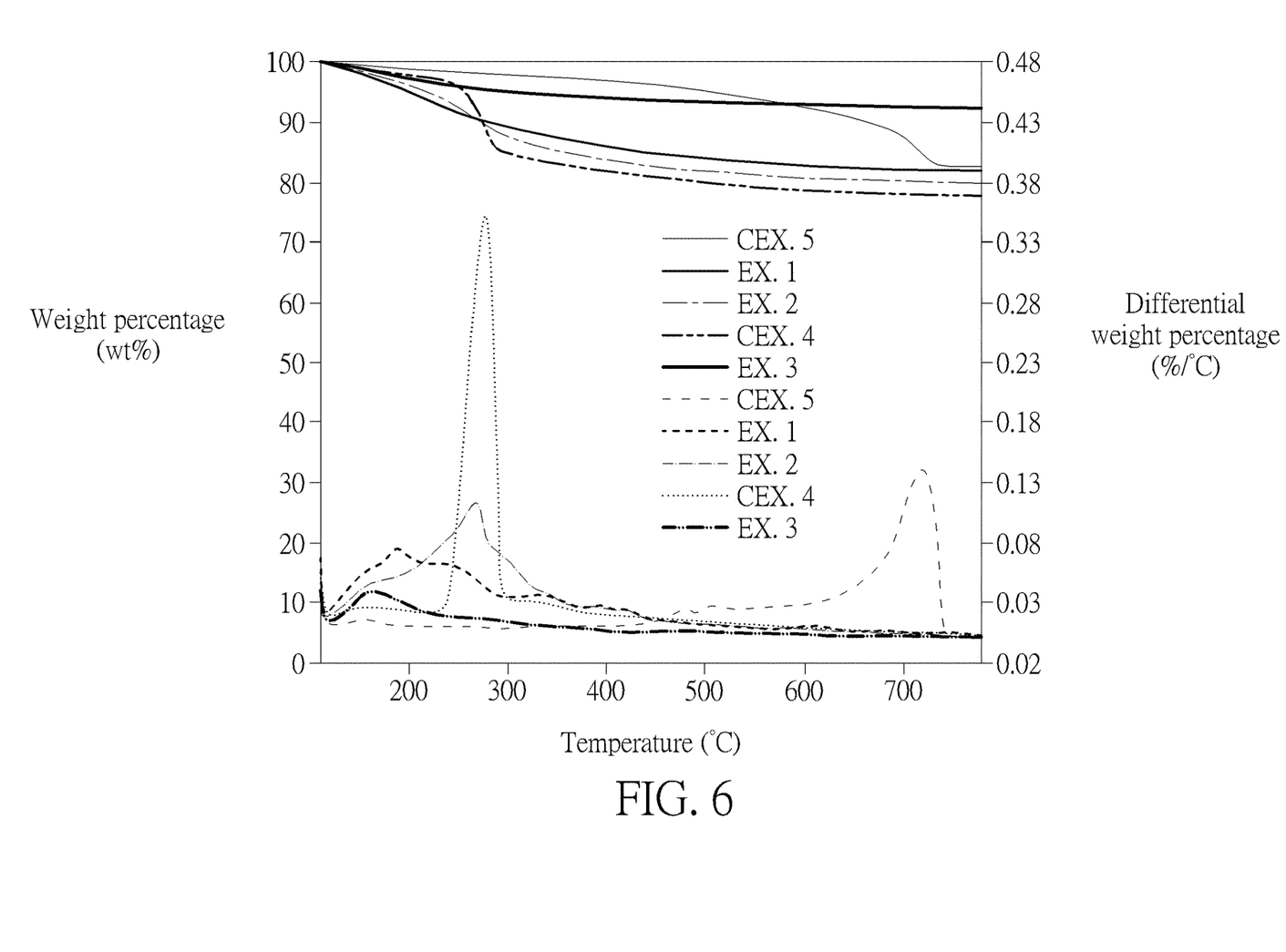
FIG. 6 shows results of thermogravimetric analysis of Examples 1, 2 and 3 and Comparative Examples 4 and 5.

Please refer to FIG. 6, which shows results of thermogravimetric analysis of EXs. 1, 2 and 3 and CEXs. 4 and 5, wherein the support precursor of CEX. 5 is a made of the support component of EX. 1. The measurement method is as follows: 5 mg of the active components of EXs. 1, 2, 3 and CEX. 4 and the support precursor of CEX. 5 are analyzed with a thermogravimetric analyzer (model: SDTQ600 TGA, TA Instruments). The temperature is increased to 800° C. with a rate of 20° C./min, and air is injected with a rate of 10 mL/min. The active components of the EXs. 1, 2 and CEX. 4 are copper hydroxide and/or nickel hydroxide. As shown in FIG. 6, during the heating process, the copper hydroxide and/or the nickel hydroxide are converted into oxides, which results in a higher weight loss. Furthermore, as shown the result of CEX. 5, the support precursor or support made of the support component of the present disclosure has a lower weight loss when the temperature is within 800° C., i.e., the support precursor or support made of the support component of the present disclosure has excellent stability at high temperature.

Compared with the prior art, the catalyst composition of the present disclosure can reduce the cost of raw materials by using the cement and the clay as the support component. According to the method for manufacturing the catalyst of the present disclosure, the support precursor does not need to be subjected to a high temperature treatment before supporting the active component. Compared with the catalyst using the aluminum oxide and/or the zirconium dioxide as the main component of the support, the method for manufacturing the catalyst of the present disclosure can omit one high temperature treatment, which is beneficial to reduce energy cost. Therefore, the catalyst of the present disclosure has the advantage of low cost, and the cost of the method for hydrogen production of the present disclosure can be reduced, too.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for manufacturing a catalyst for hydrogen production based on thermochemical reaction of methanol, the method for manufacturing the catalyst comprising:
providing a support component, wherein the support component comprises cement and clay, and a weight ratio of the cement to the clay is 3/7 to 9/1;
performing a shaping step, wherein the support component and water are mixed and shaped to obtain a support precursor;
providing an active component directly after performing the shaping step, wherein the active component is distributed on a surface of the support precursor, and the active component comprises copper oxide or a precursor of copper oxide;
performing a drying step, wherein the water in the support precursor is removed; and
performing a thermal treatment step, wherein the support precursor is sintered to form a support, so as to obtain the catalyst.

2. The method for manufacturing the catalyst of claim 1, wherein the drying step is performed at 20° C. to 100° C. for 6 hours to 72 hours.

3. The method for manufacturing the catalyst of claim 1, wherein the thermal treatment step is performed at 500° C. to 800° C. for 1 hour to 10 hours.

4. The method for manufacturing the catalyst of claim 1, wherein the support precursor is in a form of particles.

5. A catalyst, manufactured by the method for manufacturing the catalyst of claim 1, wherein the catalyst is for hydrogen production based on thermochemical reaction of methanol.

6. A method for hydrogen production based on thermochemical reaction of methanol, the method for hydrogen production comprising:
providing the catalyst of claim 5;
providing a reactant, wherein the reactant comprises methanol; and
performing a contacting step, wherein the reactant and the catalyst are contacted at a reaction temperature, such that the reactant undergoes a reaction to produce hydrogen.

7. A catalyst, manufactured by the method for manufacturing the catalyst of claim 2, wherein the catalyst is for hydrogen production based on thermochemical reaction of methanol.

8. A method for hydrogen production based on thermochemical reaction of methanol, the method for hydrogen production comprising:
providing the catalyst of claim 7;
providing a reactant, wherein the reactant comprises methanol; and
performing a contacting step, wherein the reactant and the catalyst are contacted at a reaction temperature, such that the reactant undergoes a reaction to produce hydrogen.

9. A catalyst, manufactured by the method for manufacturing the catalyst of claim 3, wherein the catalyst is for hydrogen production based on thermochemical reaction of methanol.

10. A method for hydrogen production based on thermochemical reaction of methanol, the method for hydrogen production comprising:
providing the catalyst of claim 9;
providing a reactant, wherein the reactant comprises methanol; and
performing a contacting step, wherein the reactant and the catalyst are contacted at a reaction temperature, such that the reactant undergoes a reaction to produce hydrogen.

11. A catalyst, manufactured by the method for manufacturing the catalyst of claim 4, wherein the catalyst is for hydrogen production based on thermochemical reaction of methanol.

12. A method for hydrogen production based on thermochemical reaction of methanol, the method for hydrogen production comprising:
providing the catalyst of claim 11;
providing a reactant, wherein the reactant comprises methanol; and
performing a contacting step, wherein the reactant and the catalyst are contacted at a reaction temperature, such that the reactant undergoes a reaction to produce hydrogen.

* * * * *